United States Patent
Liu et al.

(10) Patent No.: US 10,963,322 B2
(45) Date of Patent: Mar. 30, 2021

(54) DATA SHARING METHOD AND APPARATUS, AND ELECTRONIC DEVICE

(71) Applicants: GREE ELECTRIC APPLIANCES (WUHAN) CO., LTD, Wuhan (CN); GREE ELECTRIC APPLIANCES, INC. OF ZHUHAI, Zhuhai (CN)

(72) Inventors: Jie Liu, Zhuhai (CN); Linlin Diao, Zhuhai (CN); Shun Li, Zhuhai (CN); Biao Xiang, Zhuhai (CN)

(73) Assignees: GREE ELECTRIC APPLIANCES (WUHAN) CO., LTD, Wuhan (CN); GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 16/642,790

(22) PCT Filed: Jun. 22, 2018

(86) PCT No.: PCT/CN2018/092404
§ 371 (c)(1),
(2) Date: Feb. 27, 2020

(87) PCT Pub. No.: WO2019/052251
PCT Pub. Date: Mar. 21, 2019

(65) Prior Publication Data
US 2020/0341823 A1    Oct. 29, 2020

(30) Foreign Application Priority Data
Sep. 15, 2017  (CN) .......................... 201710835561.7

(51) Int. Cl.
*G06F 9/54* (2006.01)
*G06F 1/16* (2006.01)
*H04M 1/02* (2006.01)

(52) U.S. Cl.
CPC ............ *G06F 9/543* (2013.01); *G06F 1/1652* (2013.01); *G06F 2203/04803* (2013.01); *H04M 1/0214* (2013.01); *H04M 1/0268* (2013.01)

(58) Field of Classification Search
CPC .................. G06F 9/543; G06F 1/1652; G96F 2203/04803; H04M 1/0268;
(Continued)

(56) References Cited

U.S. PATENT DOCUMENTS

2007/0266333 A1* 11/2007 Cossey .................. G06F 9/543
715/769
2014/0078088 A1*  3/2014 Seo ....................... G06F 1/1626
345/173
(Continued)

FOREIGN PATENT DOCUMENTS

CN          104063195        9/2014
CN          106375474        2/2017
(Continued)

OTHER PUBLICATIONS

International Search Report issued in corresponding International Application No. PCT/CN2018/092404, dated Sep. 18, 2018, pp. 1-5, Beijing, China.
(Continued)

*Primary Examiner* — Brian W Wathen
(74) *Attorney, Agent, or Firm* — Hauptman Ham, LLP

(57) ABSTRACT

The present disclosure relates to the technical field of computers, and particularly relates to a data sharing method and an apparatus, and an electronic device. The method is applied to a mobile terminal. A display screen of the mobile terminal is a bendable display screen. The method includes determining a first application and a second application in the display screen; and in a case that it is detected that the display screen is bent, sharing the first data information of the first application to the second application.

18 Claims, 7 Drawing Sheets

(58) Field of Classification Search
CPC ............. H04M 1/0214; H04M 1/0216; H04M 1/0218; H04M 1/022
See application file for complete search history.

(56) References Cited

U.S. PATENT DOCUMENTS

| | | | |
|---|---|---|---|
| 2016/0357221 A1* | 12/2016 | Huh | H04M 1/72569 |
| 2017/0010689 A1* | 1/2017 | Bostick | G06T 3/40 |
| 2017/0052698 A1* | 2/2017 | Seo | G06F 3/0486 |
| 2018/0039387 A1* | 2/2018 | Cheong | G06F 3/0488 |
| 2018/0275763 A1* | 9/2018 | Kim | G06F 3/04845 |
| 2019/0332188 A1* | 10/2019 | Chen | G06F 3/03 |
| 2020/0175945 A1* | 6/2020 | Chen | G06F 3/0304 |

FOREIGN PATENT DOCUMENTS

| | | |
|---|---|---|
| CN | 106681711 | 5/2017 |
| CN | 106997288 | 8/2017 |
| CN | 107704167 | 2/2018 |

OTHER PUBLICATIONS

First Office Action issued in corresponding Chinese Application No. 2017108355617, pp. 1-8.
International search report dated Sep. 18, 2018 from corresponding application No. PCT/CN2018/092404.

* cited by examiner

Determining a first application and a second application in the display screen; /11

In a case that it is detected that the display screen is bent, sharing first data information of the first application to the second application /12

Fig. 1

Determining the first data information, to be shared, of the first application; /121

Determining a receiving position where the second application receives the first data information; /122

In the case that it is detected that the display screen is bent, extracting the first data information from the first application, sending the first data information to the second application, and putting the first data information at the receiving position /123

Fig. 2

DATA SHARING METHOD AND APPARATUS, AND ELECTRONIC DEVICE

CROSS REFERENCE TO RELATED APPLICATIONS

The present application is a National Phase of International Application Number PCT/CN2018/092404, filed on Jun. 22, 2018, and claims priority of Chinese Patent Application No. 201710835561.7, filed on Sep. 15, 2017, entitled "Data Sharing Method and Apparatus, and Electronic Device".

TECHNICAL FIELD

The present disclosure relates to the technical field of computers, and particularly relates to a data sharing method and apparatus, and an electronic device.

BACKGROUND

Currently, when wanting to share a piece of text or a picture in an application, a mobile terminal user usually first selects the text or the picture to be shared, copies it, and then pastes the text or picture in another application to be shared by the user.

The inventor found in the process of implementing the present disclosure that the related technology has the following problem: when the user shares the content of one application to another application, it involves switching interfaces of applications, and the paste operation can be performed only after the interface of the application to be shared is switched. In this process, the user operation is complicated, and the data sharing efficiency is low.

SUMMARY

According to an aspect of the embodiments of the present disclosure, a data sharing method is provided. The method is applied to a mobile terminal. A display screen of the mobile terminal is a bendable display screen. The method includes:

a first application and a second application in the display screen are determined;

in a case that it is detected that the display screen is bent, first data information of the first application is shared to the second application.

Optionally, in the case that it is detected that the display screen is bent, the step of sharing the first data information of the first application to the second application includes:

the first data information, to be shared, of the first application is determined;

a receiving position where the second application receives the first data information is determined;

in the case that it is detected that the display screen is bent, the first data information is extracted from the first application, the first data information is sent to the second application, and the first data information is put at the receiving position.

Optionally, in a case that the receiving position is within a search bar of the second application, the method further includes:

searching is performed according to the first data information in the search bar, and searched content is displayed.

Optionally, in a case that the first data information is text, the method further includes:

it is judged whether a format of the first data information matches a format of text in the second application;

If the format of the first data information does match the format of the text in the second application, the format of the first data information is adjusted according to the format of the text in the second application.

Optionally, in a case that there are a plurality of second applications, before determining the receiving position where the second application receives the first data information, the method further includes:

at least one of the plurality of second applications for receiving the first data information is determined, according to a bending direction of the display screen.

The step of determining the receiving position where the second application receives the first data information includes: the receiving position where the first data information is received is determined based on at least one determined second application.

Optionally, the display screen is divided into a first display area and a second display area, the first application is displayed in the first display area, the second display area is divided into a first sub-display area, a second sub-display area and a third sub-display area, and the plurality of second applications are respectively displayed in the first sub-display area, the second sub-display area and the third sub-display area;

the bending direction of the display screen includes a first direction, a second direction and a third direction;

the step of determining at least one of the plurality of second applications for receiving the first data information, according to the bending direction of the display screen, includes:

in a case that the bending direction of the display screen is the first direction, it is determined that at least one second application for receiving the first data information is at least one second application corresponding to the first sub-display area;

in a case that the bending direction of the display screen is the second direction, it is determined that at least one second application for receiving the first data information is at least one second application corresponding to the second sub-display area;

in a case that the bending direction of the display screen is the third direction, it is determined that at least one second application for receiving the first data information is at least one second application corresponding to the third sub-display area.

Optionally, a bottom side of the first sub-display area and a bottom side of the third sub-display area are respectively provided with at least one infrared sensor, and the step of determining the first direction, the second direction and the third direction specifically include:

in a case that it is detected that the first display area is bent toward the second display area, it is judged whether the infrared sensor corresponding to the first sub-display area detects a return signal and whether the infrared sensor corresponding to the third sub-display area detects a return signal;

if the infrared sensor corresponding to the first sub-display area detects the return signal and the infrared sensor corresponding to the third sub-display area does not detect the return signal, it is determined that the bending direction of the display screen is the first direction;

if the infrared sensor corresponding to the first sub-display area detects the return signal and the infrared sensor corresponding to the third sub-display area also detects the return signal, it is determined that the bending direction of the display screen is the second direction;

if the infrared sensor corresponding to the first sub-display area does not detect the return signal and the infrared sensor corresponding to the third sub-display area detects the return signal, it is determined that the bending direction of the display screen is the third direction.

According to another aspect of the embodiments of the present disclosure, a data sharing apparatus is provided. The apparatus is applied to a mobile terminal. A display screen of the mobile terminal is a bendable display screen. The apparatus includes:

a determination component, configured to determine a first application and a second application in the display screen; and a sharing component, configured to share first data information of the first application to the second application in a case that it is detected that the display screen is bent.

Optionally, the sharing component includes:

a first determination unit, configured to determine the first data information, to be shared, of the first application;

a second determination unit, configured to determine a receiving position where the second application receives the first data information; and a processing unit, configured to extract the first data information from the first application, send the first data information to the second application, and put the first data information at the receiving position in the case that it is detected that the display screen is bent.

Optionally, in a case that the receiving position is within a search bar of the second application, the apparatus further includes:

a search component, configured to search according to first data information in the search bar, and display searched content.

Optionally, in a case that the first data information is text, the apparatus further includes:

a judging component, configured to judge whether a format of the first data information matches a format of the text in the second application; and an adjusting component, configured to adjust the format of the first data information according to the format of the text in the second application if the format of the first data information does not match the format of the text in the second application.

Optionally, in a case that there are a plurality of second applications, before determining the receiving position where the second application receives the first data information, the sharing component further includes:

a third determination unit, configured to determine at least one of the plurality of second applications for receiving the first data information, according to a bending direction of the display screen;

the second determination unit is configured to determine the receiving position where the first data information is received based on at least one determined second application.

Optionally, the display screen is divided into a first display area and a second display area, the first application is displayed in the first display area, the second display area is divided into a first sub-display area, a second sub-display area and a third sub-display area, and the plurality of second applications are respectively displayed in the first sub-display area, the second sub-display area and the third sub-display area;

the bending direction of the display screen includes a first direction, a second direction and a third direction;

the third determination unit includes:

a first determination sub-unit, configured to determine that at least one second application for receiving the first data information is at least one second application corresponding to the first sub-display area in a case that the bending direction of the display screen is the first direction;

a second determination sub-unit, configured to determine that at least one second application for receiving the first data information is at least one second application corresponding to the second sub-display area in a case that the bending direction of the display screen is the second direction; and a third determination sub-unit, configured to determine that at least one second application for receiving the first data information is at least one second application corresponding to the third sub-display area in a case that the bending direction of the display screen is the third direction.

According to still another aspect of the embodiments of the present disclosure, an electronic device is provided, which includes: a processor; and a memory communicatively connected to the processor, wherein the memory stores an instruction executable by the processor, and the instruction is executed by the processor such that the processor executes the method as mentioned above.

BRIEF DESCRIPTION OF THE DRAWINGS

The one or more embodiments are exemplified by the pictures in the corresponding accompanying drawings, and the exemplary descriptions do not constitute a limitation to the embodiments. Elements in the drawings having the same reference numerals are denoted by like elements, and unless otherwise stated, the figures in the drawings do not constitute a proportional limitation.

FIG. 1 is a flowchart of a data sharing method according to an embodiment of the present application;

FIG. 2 is a flowchart of a method for sharing first data information of a first application to a second application in a data sharing method according to an embodiment of the present disclosure;

DETAILED DESCRIPTION OF THE EMBODIMENTS

Figure 3:
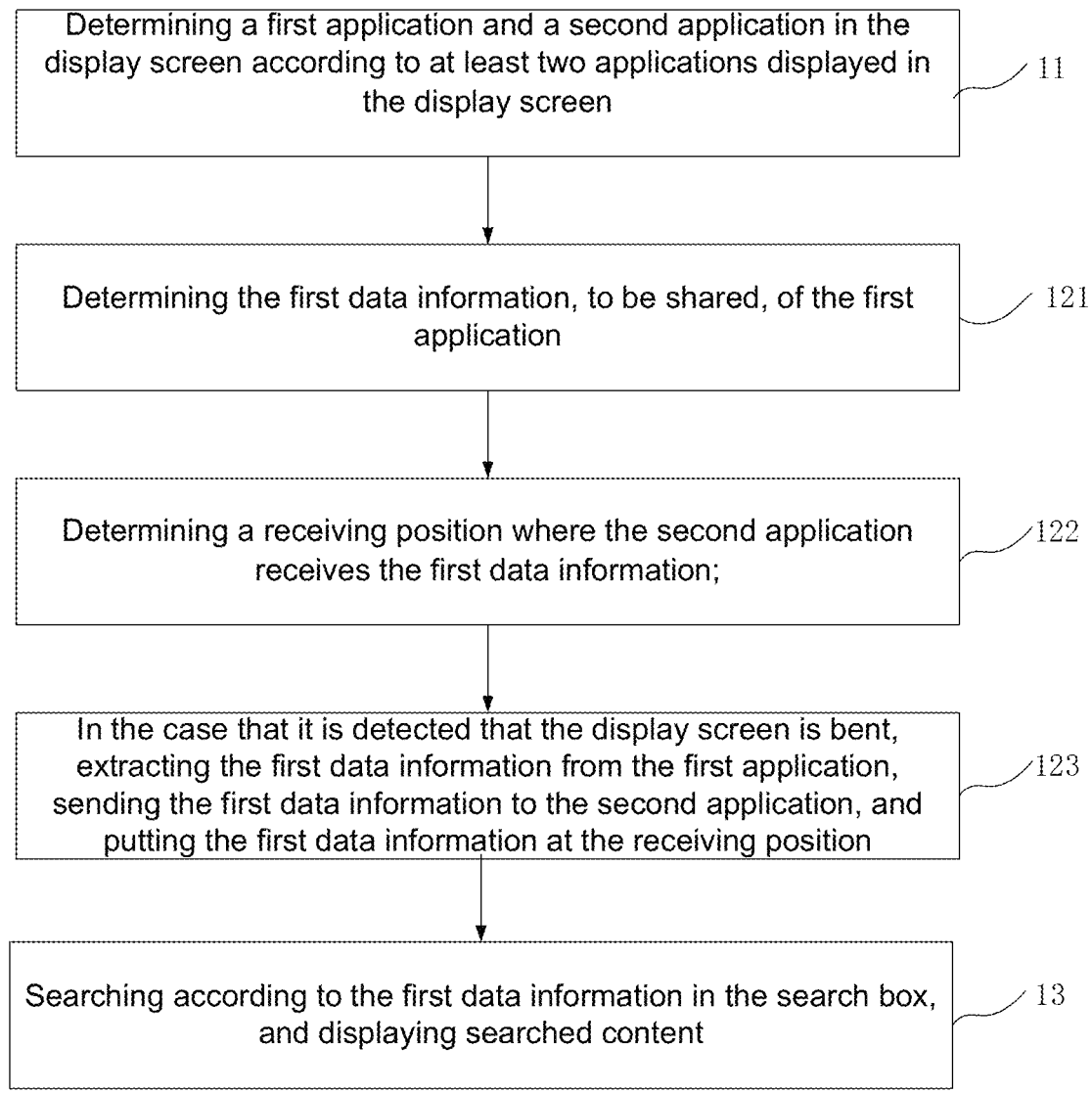
FIG. 3 is a flowchart of a data sharing method according to another embodiment of the present disclosure.

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

It is to be noted that, if there is no conflict, various features in the embodiments of the present disclosure can be combined with each other, and are all within the protection scope of the present disclosure. In addition, although functional components are divided in the apparatus diagram and a logical sequence is shown in the flowchart, in some cases, the steps shown or described can be performed in a different manner from component division in the apparatus diagram, or in a sequence different from the sequence in the flowchart. Besides, the words "first" and "second" as used herein do not limit data and the order of execution, but only distinguish the same or similar items with functions and effects that are substantially the same.

The embodiments of the present disclosure provide a data sharing method, which is applied to any suitable type of mobile terminals having a flexible display screen as a user interaction interface and having computing power. The mobile terminals can be a smart phone, a tablet, or a portable computer, and the like. The data sharing method can be implemented by an APP running on the mobile terminal, or can be implemented by software installed in the mobile terminal, or can be implemented by a system software function mode in the mobile terminal. In the present embodiment, at least two applications are simultaneously displayed in a display screen of the mobile terminal. As shown in FIG. 1, the data sharing method includes:

step 11: a first application and a second application in the display screen are determined.

The first application and the second application can be actively determined by a user of the mobile terminal. For example, two applications are selected from the at least two applications by clicking or sliding of a finger of the user on the display screen. The selected two applications are the first application and the second application. Or, the user determines the first application and the second application from the at least two applications by voice, and the like. In addition, the first application and the second application can also be determined by a mobile terminal system. Of course, in the actual application, the first application and the second application can also be determined by other means.

Optionally, the determined first application and the determined second application can be respectively located in two display areas of the display screen. For example, the display screen is divided into a first display area and a second display area, the first application is located in the first display area, and the second application is located in the second display area.

Step 12: in a case that it is detected that the display screen is bent, first data information of the first application is shared to the second application.

In the present embodiments, as shown in FIG. 2, step 12 includes:

step 121: the first data information, to be shared, of the first application is determined.

The first application can be any type of applications (APP), which can be a system application or a third-party applications. The first data information includes text, pictures, audio, video, and a certain file (such as a PDF document) and the like. In the present embodiments, the user of the mobile terminal determines the first data information, to be shared, of the first application, and the user of the mobile terminal can select the first data information on the display screen by touching the display screen, or can determine the first data information by other methods.

Step 122: a receiving position where the second application receives the first data information is determined.

The second application can also be any type of applications, which can be a system applications or a third-party applications. The second application and the first application are both displayed on the display screen, the user of the mobile terminal can indicate the receiving position of the first data information by touching the display screen, and the user of the mobile terminal can also issue a command to the mobile terminal by a voice, so that the mobile terminal determines the receiving position of the first data information. Of course, in practical applications, the receiving position for receiving the first data information can also be determined by other methods.

Step 123: in the case that it is detected that the display screen is bent, the first data information is extracted from the first application, the first data information is sent to the second application, and the first data information is put at the receiving position.

After determining the first data information, to be shared, of the first application, and after the receiving position where the second application receives the first data information, it is detected whether the display screen is bent, and if the display screen is bent, the mobile terminal acquires the first data information of the first application, then send the first data information to the second application through a preset data transmission common interface, and controls the first data information to be displayed at the receiving position of the second application. The preset data transmission common interface refers to a unified interface provided by the mobile terminal system for data transmission between applications, and the shared data can be used for data transmission between different applications through the interface. Applications that share data need to implement this interface uniformly to complete various operations in a data sharing process.

It is to be noted that a transmission process of the first data information between different applications can also be implemented in other manners.

In some embodiments, a bending angle range of the display screen can also be set, and the above data sharing process is performed only in a case that the bending angle of the display screen is within the bending angle range. By controlling the bending angle, data sharing caused by misoperation can be reduced to some extent.

In some embodiments, there can be a plurality of second applications that receive sharing and all the second applications can be displayed in the display screen. The receiving position of the first data information in all the second applications can be determined, and in the case that it is detected that the screen is bent, the first data information is sent to each second application, and the first data information is displayed at each receiving position. Thereby, oneto-many data sharing between applications can be realized, and the data sharing efficiency is improved.

In some embodiments, multiple windows of the second application can be simultaneously opened on the display screen, the receiving position of the first data information can be determined in the multiple windows, and in the case that it is detected that the display screen is bent, the first data information shared by the first application can be simultaneously shared into multiple windows of the second application displayed on the display screen. As a result, the user can share data without performing multiple operations, and the sharing efficiency is improved. The process can be illustrated by an example. For example, user A wants to distribute a certain piece of text in a Word document to multiple QQ friends. At this time, the Word document and a dialog box of each QQ friend are displayed on the display screen, after determining the certain piece of text in the Word document to be shared and the receiving position where the piece of text is received in each dialog box, it is only necessary to fold the display screen to send the piece of text to each receiving position, thereby greatly simplifying the operation of user A to share text.

The embodiments of the present disclosure provide the data sharing method, which includes: two applications to be shared with data are simultaneously displayed on the display screen of the mobile terminal, after determining the first data information to be shared of the first application and the receiving position where the second application receives the first data information, it is detected whether the display screen is bent, and in the case that the display screen is bent, the first data information is sent to the second application and put at the receiving position. According to the embodiment, the data sharing process between two applications is simplified, the data sharing efficiency is improved, and the data sharing operation of the user is facilitated.

As shown in FIG. 3, another embodiment of the present disclosure provides a data sharing method, which is mainly different from FIG. 1 and FIG. 2 in that in a case that the receiving position is within a search bar of the second application, the method further includes:

step 13: searching is performed according to the first data information in the search bar, and searched content is displayed.

It can be understood that in a case that the receiving position is within the search bar of the second application, that is, the first data information is put in the search bar of the second application. At this time, the user of the mobile terminal usually wants to perform searching according to the first data information to acquire more other information related to the first data information. Therefore, based on the above embodiments, the present embodiment directly searches according to the first data information in the search bar, and displays the searched content on the display screen.

The second application can be a search application such as Google. The second application can also be an application including a search bar, such as a video APP or an audio APP.

The embodiments of the present disclosure provide the data sharing method, which includes: two applications to be shared with data are simultaneously displayed on the display screen of the mobile terminal, after determining the first data information to be shared of the first application and the receiving position where the second application receives the first data information, it is detected whether the display screen is bent, and in the case that the display screen is bent, the first data information is sent to the second application and put at the receiving position. Further, in the case that the receiving position is within the search bar, searching is performed according to the first data information and a search result is displayed. On the one hand, the present embodiment simplifies a data sharing process between two applications, improves the data sharing efficiency, and facilitates the data sharing operation of the user. On the other hand, operations after data sharing can also be directly performed without user operations, thereby improving the user experience.

Figure 4:
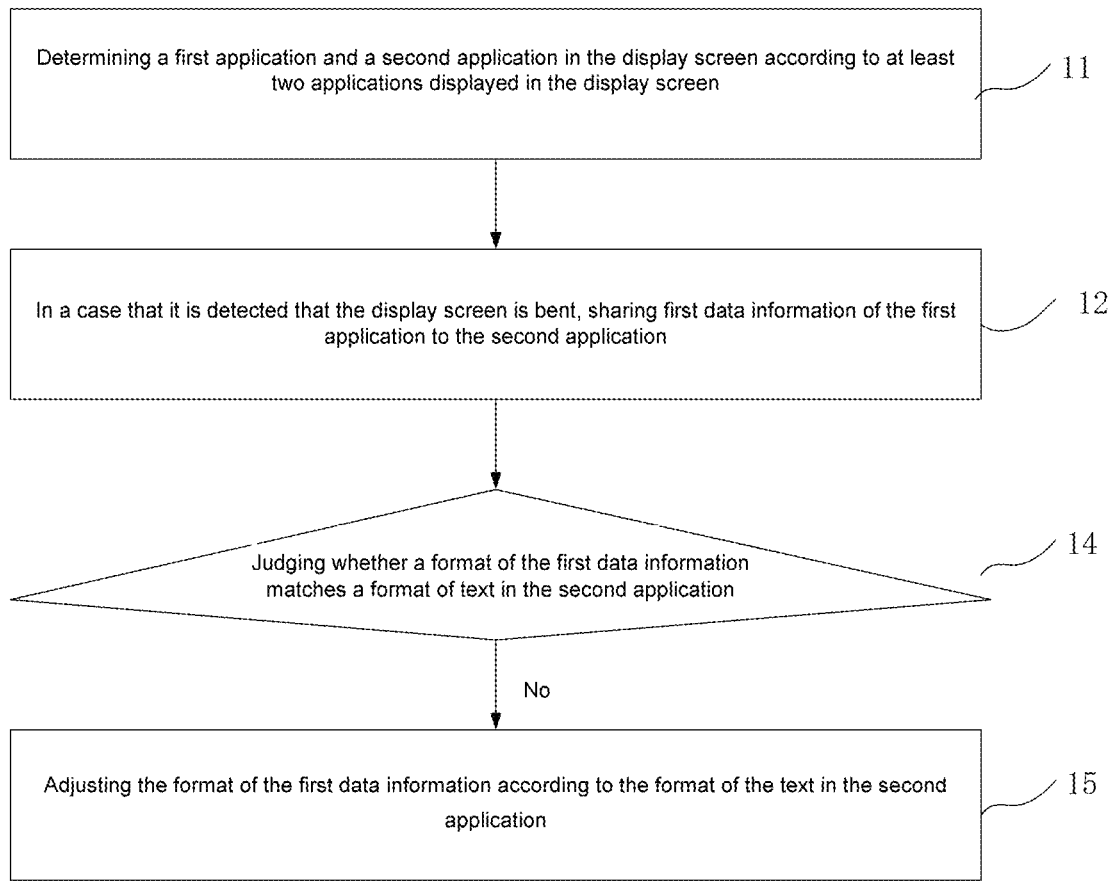
FIG. 4 is a flowchart of a data sharing method according to another embodiment of the present disclosure.

As shown in FIG. 4, still another embodiment of the present disclosure provides a data sharing method, which is mainly different from FIG. 1 in that in a case that the first data information is text, the method further includes:

step 14: it is judged whether a format of the first data information matches a format of text in the second application.

step 15: if the format of the first data information does not match the format of the text in the second application, the format of the first data information is adjusted according to the format of the text in the second application.

In the present embodiment, in the case that the shared data information is the text, it can be detected whether a text format of the shared first data information is consistent with a text format in the second application, and if the text format of the shared first data information is not consistent with the text format, the text format of the shared first data information is adjusted according to the text format in the second application.

The adjusting format includes: adjusting a font, a font size, a font color, a character shading color and the like.

The embodiments of the present disclosure provide the data sharing method, which includes: two applications to be shared with data are simultaneously displayed on the display screen of the mobile terminal, after determining the first data information to be shared of the first application and the receiving position where the second application receives the first data information, it is detected whether the display screen is bent, and in the case that the display screen is bent, the first data information is sent to the second application and put at the receiving position. In the case that the first data information is the text, the format of the first data information can be adjusted according to the format of the text of the second application. On the one hand, the present embodiment simplifies a data sharing process between two applications, improves the data sharing efficiency, and facilitates the data sharing operation of a user. On the other hand, the format of the text in the second application can be automatically unified, which greatly facilitates a processing operation of the user on shared data and improves the user experience for whom has a format requirement.

Figure 5:
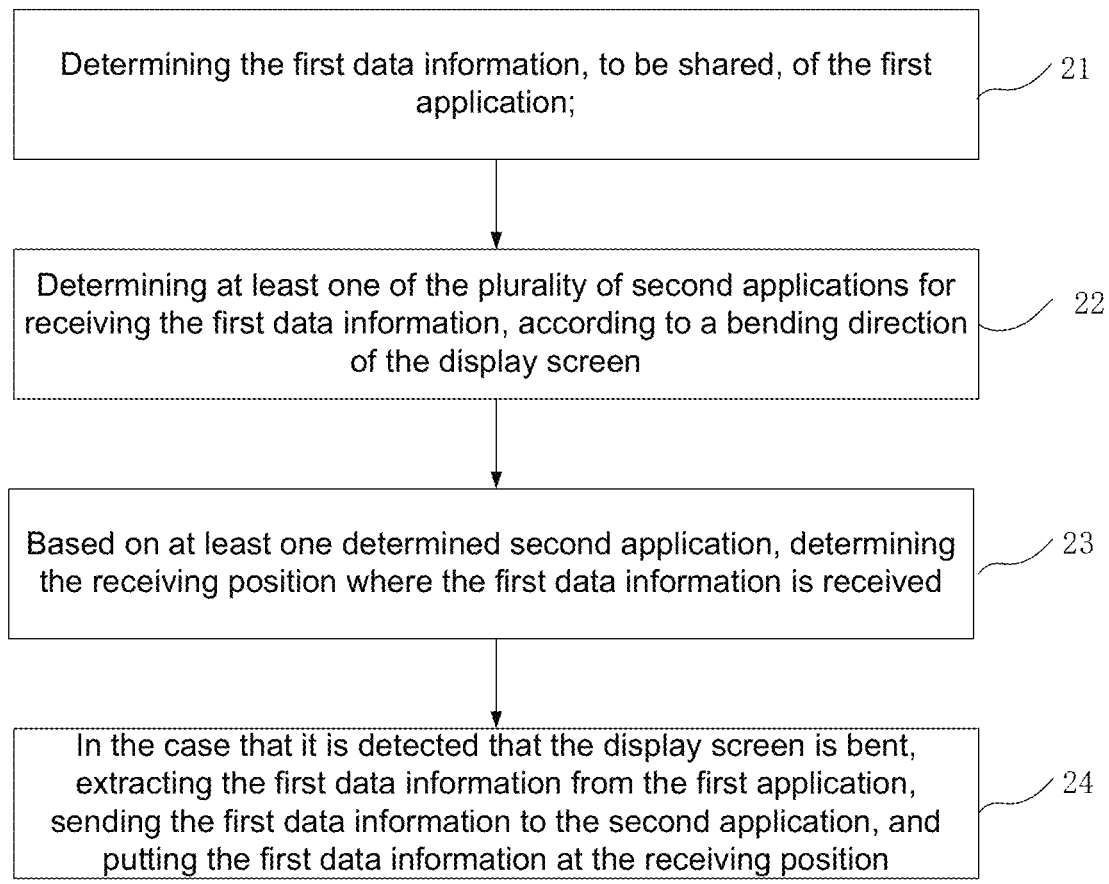
FIG. 5 is a flowchart of a data sharing method according to still another embodiment of the present disclosure.

As shown in FIG. 5, still another embodiment of the present disclosure provides a data sharing method. The method is applied to a mobile terminal. A display screen of the mobile terminal is a bendable display screen. A first application and multiple second applications are simultaneously displayed in the display screen. The display screen of the mobile terminal is divided into a first display area and a second display area, the first application is displayed in the first display area, the second display area is divided into a first sub-display area, a second sub-display area and a third sub-display area, and the multiple second applications are respectively displayed in the first sub-display area, the second sub-display area and the third sub-display area. The method includes:

step 21: it is determined that first data information, to be shared, of the first application.

Step 22: determining at least one of the plurality of second applications for receiving the first data information, according to a bending direction of the display screen.

Figure 6:
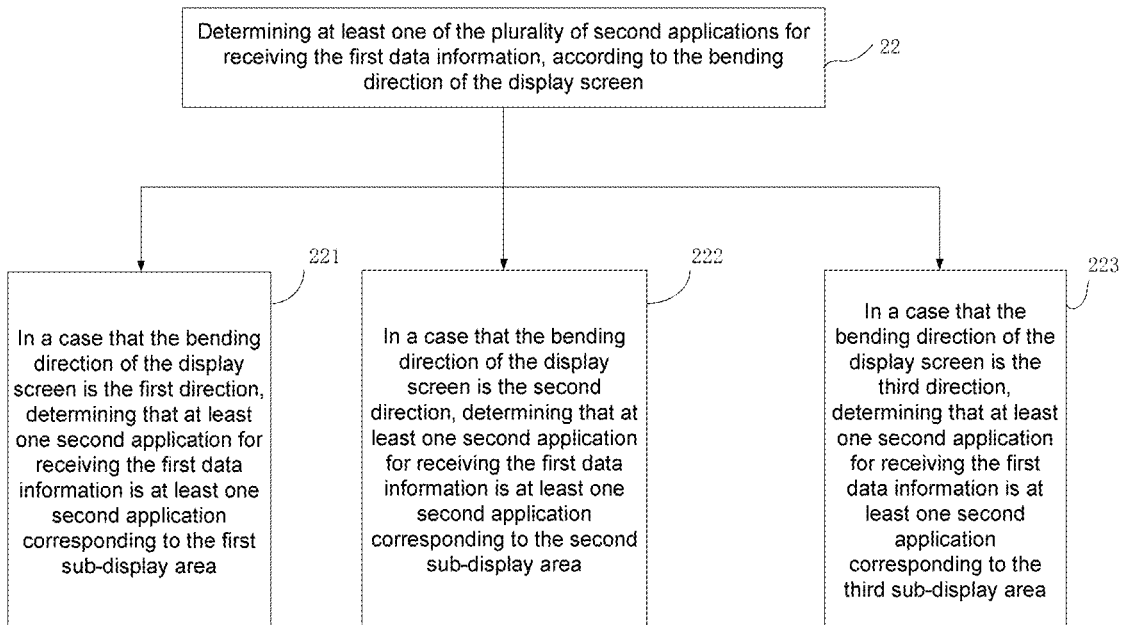
FIG. 6 is a flowchart of a method for determining a second application for receiving first data information according to a bending direction of a display screen in a data sharing method according to still another embodiment of the present disclosure.

In the present embodiment, the bending direction of the display screen includes a first direction, a second direction and a third direction. As shown in FIG. 6, step 22, determining at least one of the plurality of second applications for receiving the first data information, according to the bending direction of the display screen, includes:

step 221: in a case that the bending direction of the display screen is the first direction, determining that at least one second application for receiving the first data information is at least one second application corresponding to the first sub-display area;

step 222: in a case that the bending direction of the display screen is the second direction, determining that at least one second application for receiving the first data information is at least one second application corresponding to the second sub-display area;

Step 223: in a case that the bending direction of the display screen is the third direction, determining that at least one second application for receiving the first data information is at least one second application corresponding to the third sub-display area.

Each of the first sub-display area, the second sub-display area and the third sub-display area can include a second application, or can include multiple second applications. Alternatively, the first sub-display area and the third sub-display area include at least one of the second applications, and the second sub-display area does not include a second application. The number of the second applications displayed in the first sub-display area, the second sub-display area and the third sub-display area is not limited herein.

Figure 7:
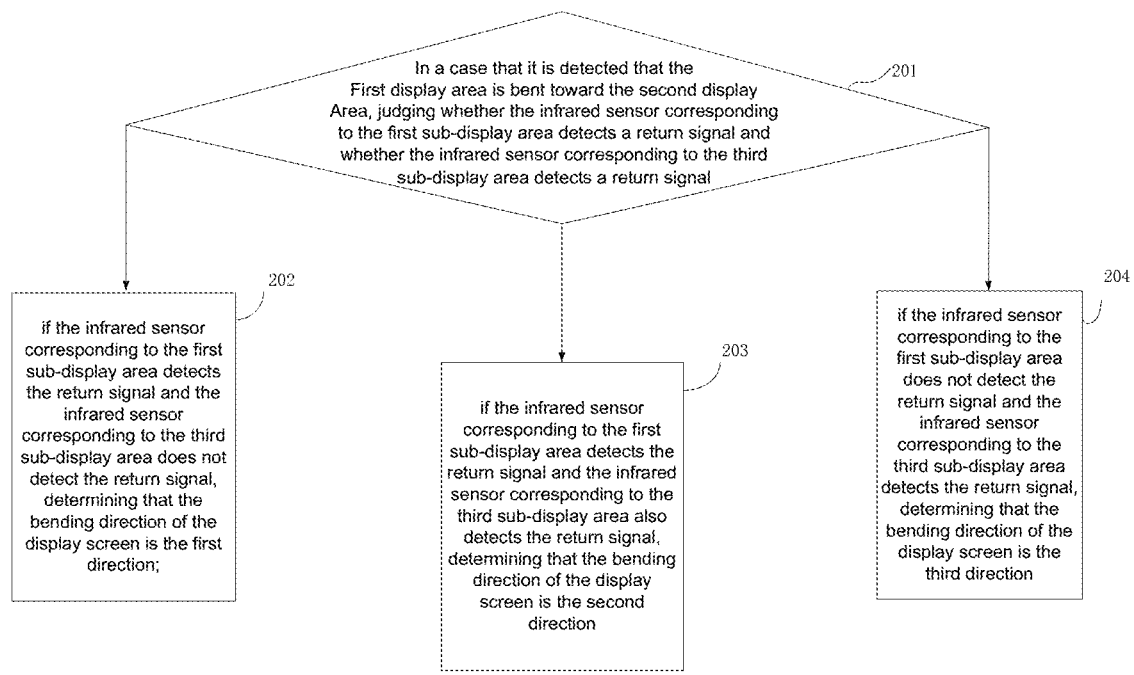
FIG. 7 is a flowchart of a method for determining a first direction, a second direction and a third direction in a data sharing method according to still another embodiment of the present disclosure.

A bottom side of the first sub-display area and a bottom side of the third sub-display area can be respectively provided with at least one infrared sensor. Therefore, as shown in FIG. 7, determining the first direction, the second direction and the third direction specifically includes:

step 201: in a case that it is detected that the first display area is bent toward the second display area, judging whether the infrared sensor corresponding to the first sub-display area detects a return signal and whether the infrared sensor corresponding to the third sub-display area detects a return signal;

step 202: if the infrared sensor corresponding to the first sub-display area detects the return signal and the infrared sensor corresponding to the third sub-display area does not detect the return signal, determining that the bending direction of the display screen is the first direction;

step 203: if the infrared sensor corresponding to the first sub-display area detects the return signal and the infrared sensor corresponding to the third sub-display area also detects the return signal, determining that the bending direction of the display screen is the second direction;

Step 204: if the infrared sensor corresponding to the first sub-display area does not detect the return signal and the infrared sensor corresponding to the third sub-display area detects the return signal, determining that the bending direction of the display screen is the third direction.

Here, the bending direction of the display screen is determined according to the positioning principle of the infrared sensor. The positioning principle of the infrared sensor can refer to the description of the conventional art.

Figure 8:
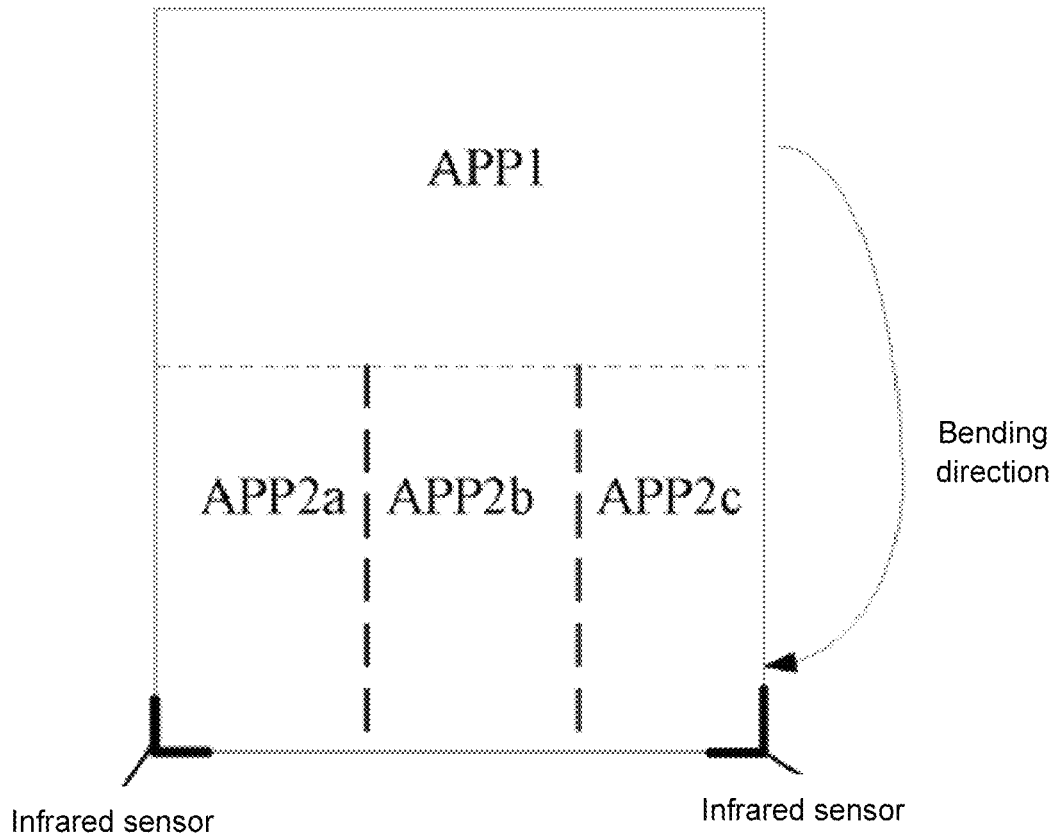
FIG. 8 is a schematic of a display screen of a mobile terminal in a data sharing method according to still another embodiment of the present disclosure.

In the present embodiment, in the case that there are multiple second applications on the display screen, at least one second application that receives data to be shared is determined according to a bending of the display screen. The division of the first display area, the second display area, the first sub-display area, the second sub-display area, and the third sub-display area can refer to FIG. 8. It is to be noted that FIG. 8 is only used to explain the idea of the embodiments of the present disclosure and is not intended to limit the embodiments of the present disclosure. Those skilled in the art can understand that the first display area, the second display area, the first sub-display area, the second sub-display area, and the third sub-display area can be divided by other means, and the infrared sensors are disposed at other positions.

Step 23: a receiving position where the first data information is received is determined based on at least one determined second application.

Step 24: in the case that it is detected that the display screen is bent, the first data information is extracted from the first application, the first data information is sent to the second application, and the first data information is put at the receiving position.

The above step 21, step 23 and step 24 can refer to the description of the above method embodiments, and details are not described herein again.

The embodiments of the present disclosure provide the data sharing method, which displays one first application and multiple second applications simultaneously on the display screen, defines the position of each application, determines at least one second application that receives data to be shared by bending the display screen, and triggers the sharing of data by bending the display screen. The present embodiment enriches the data sharing method, improves the data sharing efficiency, facilitates the data sharing operation of a user, and improves the user experience.

Figure 9:
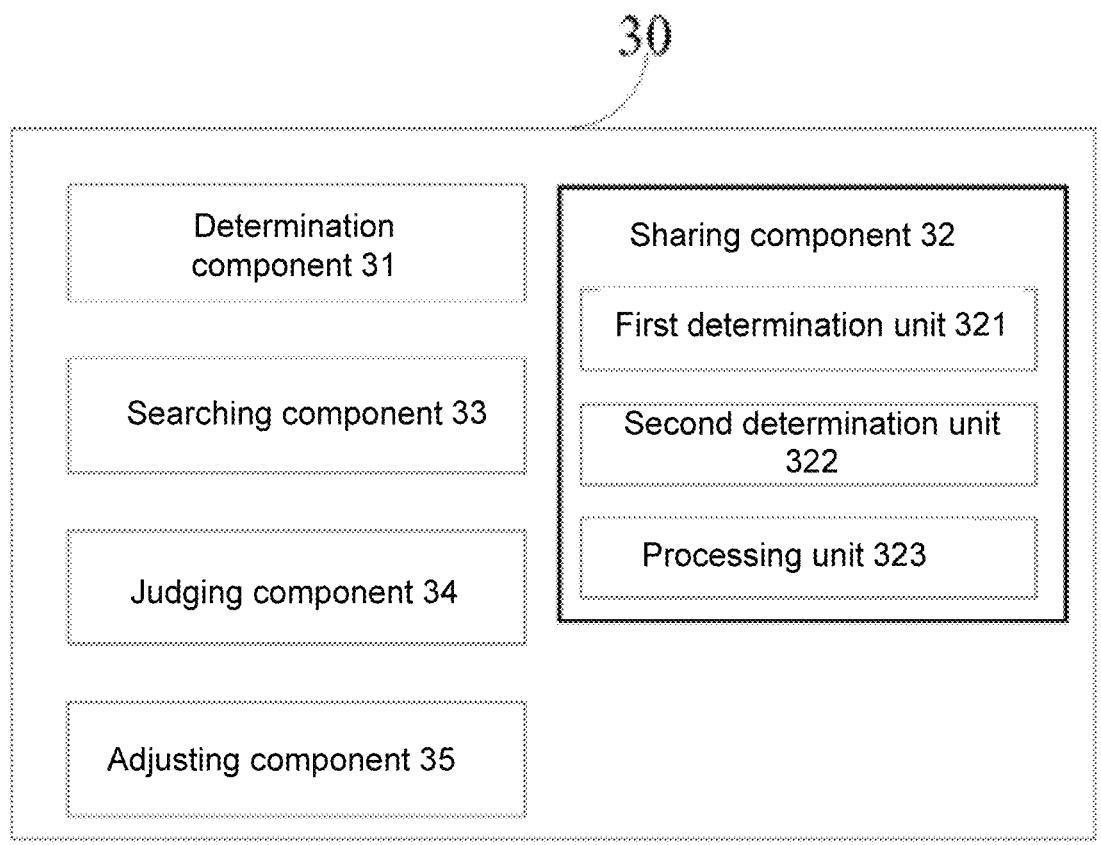
FIG. 9 is a structural schematic of a data sharing apparatus according to an embodiment of the present disclosure.

As shown in FIG. 9, it is a structural schematic of a data sharing apparatus according to some embodiments of the present disclosure. The apparatus 30 is applied to a mobile terminal, a display screen of the mobile terminal is a bendable display screen, at least two applications are simultaneously displayed in the display screen, and the apparatus 30 includes a determination component 31 and a sharing component 32.

The determination component 31 is configured to determine a first application and a second application in the display screen. The sharing component 32 is configured to share first data information of the first application to the second application in a case that it is detected that the display screen is bent.

In the present embodiment, the sharing component 32 includes a first determination unit 321, a second determination unit 322 and a processing unit 323.

The first determination unit 321 is configured to determine the first data information, to be shared, of the first application. The second determination unit 322 is configured to determine a receiving position where the second application receives the first data information. The processing unit 323 is configured to extract the first data information from the first application, send the first data information to the second application, and put the first data information at the receiving position, in other words, show the first data information at the receiving position in the case that it is detected that the display screen is bent.

In some embodiments, in a case that the receiving position is within a search bar of the second application, as shown in FIG. 9, the apparatus 30 further includes a search component 33, the search component 33 is configured to search according to the first data information in the search bar, and display searched content.

In some embodiments, in a case that the first data information is text, as shown in FIG. 9, the apparatus 30 further includes a judging component 34 and an adjusting component 35. The judging component 34 is configured to judge whether a format of the first data information matches a format of text in the second application. The adjusting component 35 is configured to adjust the format of the first data information according to the format of the text in the second application if the format of the first data information does not match the format of the text in the second application.

It is to be noted that since the information interaction, the execution process, and the like between the components in the data sharing apparatus in the embodiment of the present disclosure are based on the same concept as the method embodiment of the present disclosure, the specific content of the method embodiment of the present disclosure is also applicable to the data sharing apparatus. The various components in the embodiments of the present disclosure can be implemented as separate hardware or software, and a combination of functions of the respective units can be implemented using separate hardware or separate software as needed.

The embodiments of the present disclosure provide the data sharing apparatus, which makes two applications to be shared with data be simultaneously displayed on the display screen of the mobile terminal, after determining the first data information to be shared of the first application and the receiving position where the second application receives the first data information, it is detected whether the display screen is bent, and in the case that the display screen is bent, the first data information is sent to the second application and put at the receiving position. According to the embodiment, a data sharing process between two applications is simplified, the data sharing efficiency is improved, and the data sharing operation of a user is facilitated.

Figure 10:
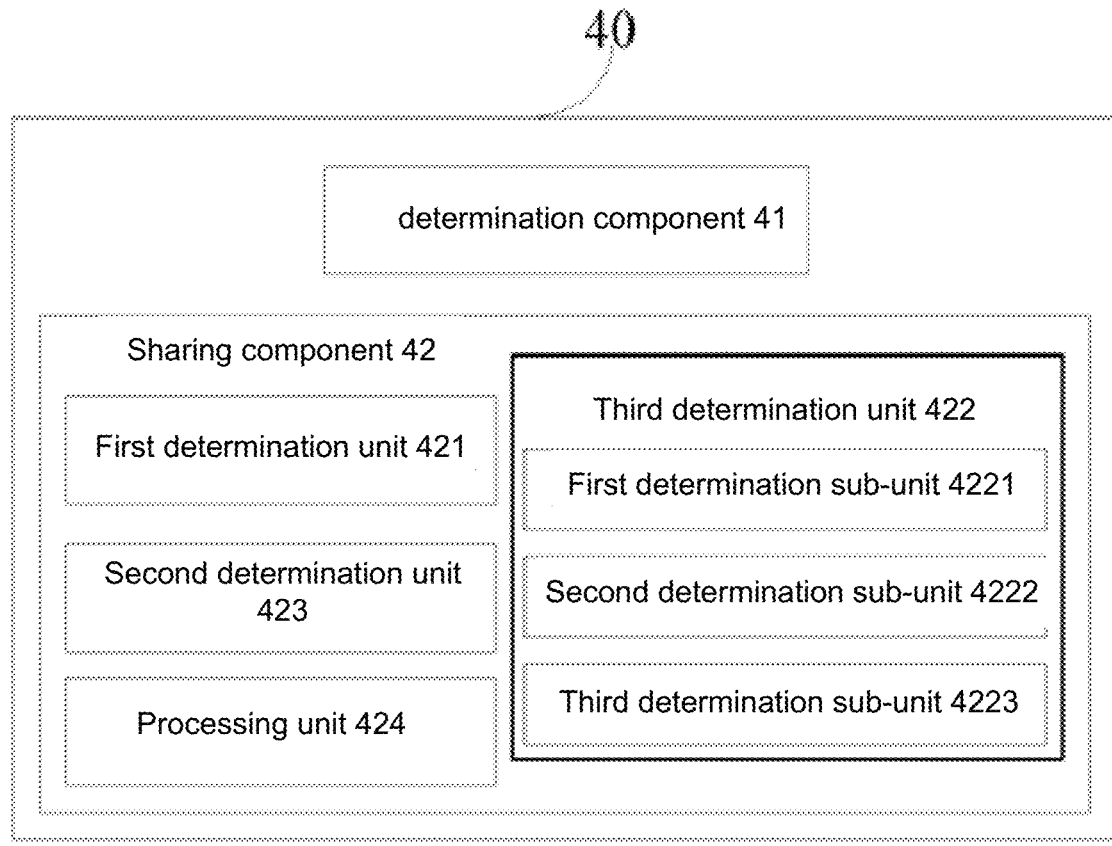
FIG. 10 is a structural schematic of a data sharing apparatus according to another embodiment of the present disclosure.

As shown in FIG. 10, it is a structural schematic of a data sharing apparatus according to another embodiment of the present disclosure. The apparatus 40 is applied to a mobile terminal. A display screen of the mobile terminal is a bendable display screen. One first application and multiple second applications are simultaneously displayed in the display screen. The apparatus 40 includes a determination component 41 and a sharing component 42.

The determination component 41 is configured to determine the first application and the second application in the display screen.

The sharing component 42 includes a first determination unit 421, a third determination unit 422, a second determination unit 423, and a processing unit 424.

The first determination unit 421 is configured to determine the first data information, to be shared, of the first application. The third determination unit 422 is configured to determine at least one of the plurality of second applications for receiving the first data information, according to a bending direction of the display screen. The second determination unit 423 is configured to determine the receiving position where the first data information is received based on at least one determined second application. The processing unit 424 is configured to extract the first data information from the first application, send the first data information to the second application, and put the first data information at the receiving position in the case that it is detected that the display screen is bent.

The display screen is divided into a first display area and a second display area, the first application is displayed in the first display area, the second display area is divided into a first sub-display area, a second sub-display area and a third sub-display area, and the multiple second applications are respectively displayed in the first sub-display area, the second sub-display area and the third sub-display area. The bending direction of the display screen includes a first direction, a second direction and a third direction. At this time, the third determination unit 422 includes a first determination sub-unit 4221, a second determination sub-unit 4222, and a third determination sub-unit 4223.

The first determination sub-unit 4221 is configured to determine that at least one second application for receiving the first data information is at least one second application corresponding to the first sub-display area in a case that the bending direction of the display screen is the first direction. The second determination sub-unit 4222 is configured to determine that at least one second application for receiving the first data information is at least one second application corresponding to the second sub-display area in a case that the bending direction of the display screen is the second direction. The third determination sub-unit 4223 is configured to determine that at least one second application for receiving the first data information is at least one second application corresponding to the third sub-display area in a case that the bending direction of the display screen is the third direction.

In a case that a bottom side of the first sub-display area and a bottom side of the third sub-display area are respectively provided with at least one infrared sensor, determining the first direction, the second direction and the third direction specifically includes: in a case that it is detected that the first display area is bent toward the second display area, judging whether the infrared sensor corresponding to the first sub-display area detects a return signal and whether the infrared sensor corresponding to the third sub-display area detects a return signal; if the infrared sensor corresponding to the first sub-display area detects the return signal and the infrared sensor corresponding to the third sub-display area does not detect the return signal, determining that the bending direction of the display screen is the first direction; if the infrared sensor corresponding to the first sub-display area detects the return signal and the infrared sensor corresponding to the third sub-display area also detects the return signal, determining that the bending direction of the display screen is the second direction; and if the infrared sensor corresponding to the first sub-display area does not detect the return signal and the infrared sensor corresponding to the third sub-display area detects the return signal, determining that the bending direction of the display screen is the third direction.

It is to be noted that since the information interaction, the execution process, and the like between the components in the data sharing apparatus in the embodiment of the present disclosure are based on the same concept as the method embodiment of the present disclosure, the specific content of the method embodiment of the present disclosure is also applicable to the data sharing apparatus. The various components in the embodiments of the present disclosure can be implemented as separate hardware or software, and a combination of functions of the respective units can be implemented using separate hardware or separate software as needed.

The embodiment of the present disclosure provides the data sharing apparatus, which displays one first application and multiple second applications simultaneously on the display screen, defines the position of each application, determines at least one second application that receives data to be shared by bending the display screen, and triggers the sharing of data by bending the display screen. The present embodiment improves the data sharing efficiency, facilitates the data sharing operation of a user, and improves the user experience.

Figure 11:
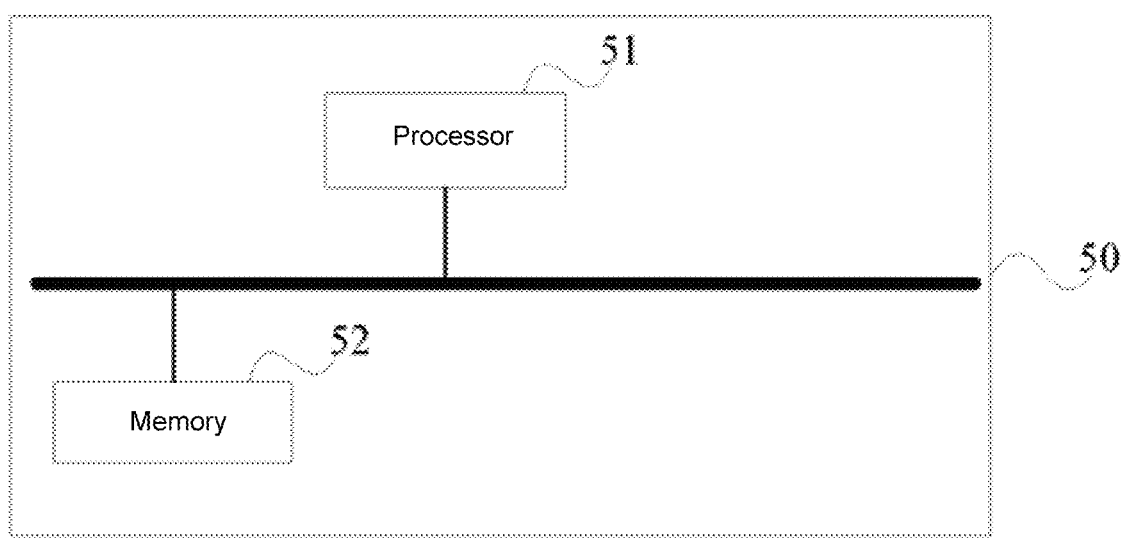
FIG. 11 is a schematic structure of an electronic device according to some embodiments of the present disclosure.

As shown in FIG. 11, FIG. 11 is a schematic structure of an electronic device according to some embodiments of the present disclosure. The electronic device 50 includes a processor 51 and a memory 52.

The processor 51 and the memory 52 are electrically connected.

The memory 52 is used as a non-volatile computer-readable storage medium, and can be configured to store non-volatile software programs, non-volatile computer-executable programs, and components, such as program instructions/components (for example, the determination component 31, the sharing component 32, the searching component 33, the judging component 34, and the adjusting component 35 shown in FIG. 9) corresponding to the data sharing method in the embodiments of the present disclosure. The processor 51 executes various functional applications of a server and data processing by executing non-volatile software programs, instructions and components stored in the memory 52, that is, implementing the data sharing method of the above method embodiments.

The memory 52 can include a storage program area and a storage data area, wherein the storage program area can store an operating system and at least one application required for at least one function; and the storage data area can store data created according to usage of the data sharing apparatus, and the like.

The one or more components are stored in the memory 52, and in a case that the one or more components are executed by the one or more processors 51, a data sharing method in any one of the above method embodiments is performed. For example, the above described method step 11 to step 12 in FIG. 1, method step 121 to step 123 in FIG. 2, method step 11 to step 13 in FIG. 3, method step 11 to step 15 in FIG. 4, method step 21 to step 24 in FIG. 5, method step 221 to step 223 in FIG. 6, method step 201 to step 204 in FIG. 7, and functions of components 31-35 and units 321-323 in FIG. 9, and components 41-42, units 421-424 and sub-units 4221-4223 in FIG. 10 are performed.

The above products can perform the methods provided by the embodiments of the present disclosure, and have the corresponding functional components and beneficial effects of execution methods. For technical details that are not described in detail in the present embodiment, reference may be made to the methods provided by the embodiments of the present disclosure.

The embodiments of the present disclosure provide a non-volatile computer-readable storage medium which stores computer-executable instructions that are executed by an electronic device to perform a data sharing method in any of the above method embodiments. For example, the above described method step 11 to step 12 in FIG. 1, method step 121 to step 123 in FIG. 2, method step 11 to step 13 in FIG. 3, method step 11 to step 15 in FIG. 4, method step 21 to step 24 in FIG. 5, method step 221 to step 223 in FIG. 6, method step 201 to step 204 in FIG. 7, and functions of components 31-35 and units 321-323 in FIG. 9, and components 41-42, units 421-424 and sub-units 4221-4223 in FIG. 10 are performed.

The embodiments of the present disclosure provide a computer program product, including a computing program stored on a non-volatile computer-readable storage medium, the computer program includes program instructions, and in a case that the program instructions are executed by a computer, the computer performs a data sharing method in any of the above method embodiments. For example, the above described method step 11 to step 12 in FIG. 1, method step 121 to step 123 in FIG. 2, method step 11 to step 13 in FIG. 3, method step 11 to step 15 in FIG. 4, method step 21 to step 24 in FIG. 5, method step 221 to step 223 in FIG. 6, method step 201 to step 204 in FIG. 7, and functions of components 31-35 and units 321-323 in FIG. 9, and components 41-42, units 421-424 and sub-units 4221-4223 in FIG. 10 are performed.

The apparatus embodiments described above are merely illustrative, wherein the units described as separate components may or may not be physically separated, and the components displayed as units may or may not be physical units, which may be located in one place or distributed to multiple network units. Some or all of the components can be selected according to actual needs to achieve the purpose of the solution of the present embodiment.

Through the description of the above embodiments, those of ordinary skill in the art can clearly understand that each embodiment can be implemented by means of software plus a necessary general hardware platform, and of course, can also be implemented through hardware. Those of ordinary skill in the art can understand that all or part of the processes in the above method embodiments can be implemented by a computer program to instruct related hardware, and the program can be stored in the computer-readable storage medium. In a case that the program is executed, the flow of each method embodiment as described above can be included. The storage medium can be a magnetic disk, an optical disk, a read-only memory (ROM), or a random access memory (RAM).

Finally, it is to be noted that the above embodiments are only used to illustrate the technical solutions of the present disclosure, and are not limited thereto. The technical features in the above embodiments or different embodiments may also be combined under the concept of the present disclosure, the steps may be implemented in any order, there are many other variations of different aspects of the present disclosure as described above, and for the sake of brevity, they are not provided in the details. Although the present disclosure has been described in detail with reference to the foregoing embodiments, those skilled in the art should understand that the technical solutions described in the foregoing embodiments are modified, or some technical features are equivalently replaced, but the modifications and replacements do not make the essence of the corresponding technical solutions depart from the scope of the technical solutions of various embodiments of the present disclosure.

What is claimed is:

1. A data sharing method, applied to a mobile terminal, a display screen of the mobile terminal being a bendable display screen, the method comprising:
    determining a first application and a second application in the display screen; and
    in a case that it is detected that the display screen is bent, sharing first data information of the first application to the second application, wherein in the case that it is detected that the display screen is bent, sharing the first data information of the first application to the second application comprises:
    determining the first data information, to be shared, of the first application;
    determining a receiving position where the second application receives the first data information; and
    in the case that it is detected that the display screen is bent, extracting the first data information from the first application, sending the first data information to the second application, and putting the first data information at the receiving position.

2. The data sharing method as claimed in claim 1, wherein in a case that the receiving position is within a search bar of the second application,
the method further comprises:
searching according to the first data information in the search bar, and displaying searched content.

3. The data sharing method as claimed in claim 2, wherein in a case that there are a plurality of second applications, before determining the receiving position where the second application receives the first data information, the method further comprises:
determining at least one of the plurality of second applications for receiving the first data information, according to a bending direction of the display screen;
determining the receiving position where the second application receives the first data information comprises: based on at least one determined second application, determining the receiving position where the first data information is received.

4. The data sharing method as claimed in claim 1, wherein in a case that the first data information is text,
the method further comprises:
judging whether a format of the first data information matches a format of text in the second application; and
if the format of the first data information does not match the format of the text in the second application, adjusting the format of the first data information according to the format of the text in the second application.

5. The data sharing method as claimed in claim 1, wherein in a case that there are a plurality of second applications, before determining the receiving position where the second application receives the first data information, the method further comprises:
determining at least one of the plurality of second applications for receiving the first data information, according to a bending direction of the display screen;
determining the receiving position where the second application receives the first data information comprises: based on at least one determined second application, determining the receiving position where the first data information is received.

6. The data sharing method as claimed in claim 5, wherein the display screen is divided into a first display area and a second display area, the first application is displayed in the first display area, the second display area is divided into a first sub-display area, a second sub-display area and a third sub-display area, and the plurality of second applications are respectively displayed in the first sub-display area, the second sub-display area and the third sub-display area;
the bending direction of the display screen comprises a first direction, a second direction and a third direction;
determining at least one of the plurality of second applications for receiving the first data information, according to the bending direction of the display screen, comprises:
in a case that the bending direction of the display screen is the first direction, determining that at least one second application for receiving the first data information is at least one second application corresponding to the first sub-display area;
in a case that the bending direction of the display screen is the second direction, determining that at least one second application for receiving the first data information is at least one second application corresponding to the second sub-display area; and
in a case that the bending direction of the display screen is the third direction, determining that at least one second application for receiving the first data information is at least one second application corresponding to the third sub-display area.

7. The data sharing method as claimed in claim 6, wherein a bottom side of the first sub-display area and a bottom side of the third sub-display area are respectively provided with at least one infrared sensor, and determining the first direction, the second direction and the third direction specifically comprises:
in a case that it is detected that the first display area is bent toward the second display area, judging whether the infrared sensor corresponding to the first sub-display area detects a return signal and whether the infrared sensor corresponding to the third sub-display area detects a return signal;
if the infrared sensor corresponding to the first sub-display area detects the return signal and the infrared sensor corresponding to the third sub-display area does not detect the return signal, determining that the bending direction of the display screen is the first direction;
if the infrared sensor corresponding to the first sub-display area detects the return signal and the infrared sensor corresponding to the third sub-display area also detects the return signal, determining that the bending direction of the display screen is the second direction; and
if the infrared sensor corresponding to the first sub-display area does not detect the return signal and the infrared sensor corresponding to the third sub-display area detects the return signal, determining that the bending direction of the display screen is the third direction.

8. The data sharing method as claimed in claim 1, wherein in a case that the first data information is text,
the method further comprises:
judging whether a format of the first data information matches a format of text in the second application; and
if the format of the first data information does not match the format of the text in the second application, adjusting the format of the first data information according to the format of the text in the second application.

9. A data sharing apparatus, applicable to a mobile terminal, a display screen of the mobile terminal being a bendable display screen, the apparatus comprising:
a determination component, configured to determine a first application and a second application in the display screen; and
a sharing component, configured to share first data information of the first application to the second application in a case that it is detected that the display screen is bent, wherein the sharing component comprises:
a first determination unit, configured to determine the first data information, to be shared, of the first application;
a second determination unit, configured to determine a receiving position where the second application receives the first data information; and
a processing unit, configured to extract the first data information from the first application, send the first data information to the second application, and put the first data information at the receiving position in the case that it is detected that the display screen is bent.

10. The data sharing apparatus as claimed in claim 9, wherein
in a case that the receiving position is within a search bar of the second application,
the apparatus further comprises:
a search component, configured to search according to the first data information in the search bar, and display searched content.

11. The data sharing apparatus as claimed in claim 10, wherein
in a case that there are a plurality of second applications, before determining the receiving position where the second application receives the first data information, the sharing component further comprises:
a third determination unit, configured to determine at least one of the plurality of second applications for receiving the first data information, according to a bending direction of the display screen;
the second determination unit is configured to determine the receiving position where the first data information is received based on at least one determined second application.

12. The data sharing apparatus as claimed in claim 9, wherein
in a case that the first data information is text,
the apparatus further comprises:
a judging component, configured to judge whether a format of the first data information matches a format of text in the second application; and
an adjusting component, configured to adjust the format of the first data information according to the format of the text in the second application if the format of the first data information does not match the format of the text in the second application.

13. The data sharing apparatus as claimed in claim 9, wherein
in a case that there are a plurality of second applications, before determining the receiving position where the second application receives the first data information, the sharing component further comprises:
a third determination unit, configured to determine at least one of the plurality of second applications for receiving the first data information, according to a bending direction of the display screen;
the second determination unit is configured to determine the receiving position where the first data information is received based on at least one determined second application.

14. The data sharing apparatus as claimed in claim 13, wherein the display screen is divided into a first display area and a second display area, the first application is displayed in the first display area, the second display area is divided into a first sub-display area, a second sub-display area and a third sub-display area, and the plurality of second applications are respectively displayed in the first sub-display area, the second sub-display area and the third sub-display area;
the bending direction of the display screen comprises a first direction, a second direction and a third direction;
the third determination unit comprises:
a first determination sub-unit, configured to determine that at least one second application for receiving the first data information is at least one second application corresponding to the first sub-display area in a case that the bending direction of the display screen is the first direction;
a second determination sub-unit, configured to determine that at least one second application for receiving the first data information is at least one second application corresponding to the second sub-display area in a case that the bending direction of the display screen is the second direction; and
a third determination sub-unit, configured to determine that at least one second application for receiving the first data information is at least one second application corresponding to the third sub-display area in a case that the bending direction of the display screen is the third direction.

15. The data sharing apparatus as claimed in claim 9, wherein
in a case that the first data information is text,
the apparatus further comprises:
a judging component, configured to judge whether a format of the first data information matches a format of text in the second application; and
an adjusting component, configured to adjust the format of the first data information according to the format of the text in the second application if the format of the first data information does not match the format of the text in the second application.

16. An electronic device, comprising: a processor; and a memory communicatively connected to the processor, wherein the memory stores an instruction executable by the processor, and the instruction is executed by the processor such that the processor executes the method as claimed in claim 1.

17. An electronic device, comprising: a processor; and a memory communicatively connected to the processor, wherein the memory stores an instruction executable by the processor, and the instruction is executed by the processor such that the processor executes the method as claimed in claim 1.

18. An electronic device, comprising: a processor; and a memory communicatively connected to the processor, wherein the memory stores an instruction executable by the processor, and the instruction is executed by the processor such that the processor executes the method as claimed in claim 2.

* * * * *